No. 880,542. PATENTED MAR. 3, 1908.
J. M. W. KITCHEN.
HEATING SYSTEM.
APPLICATION FILED JAN. 9, 1907.
2 SHEETS—SHEET 1.
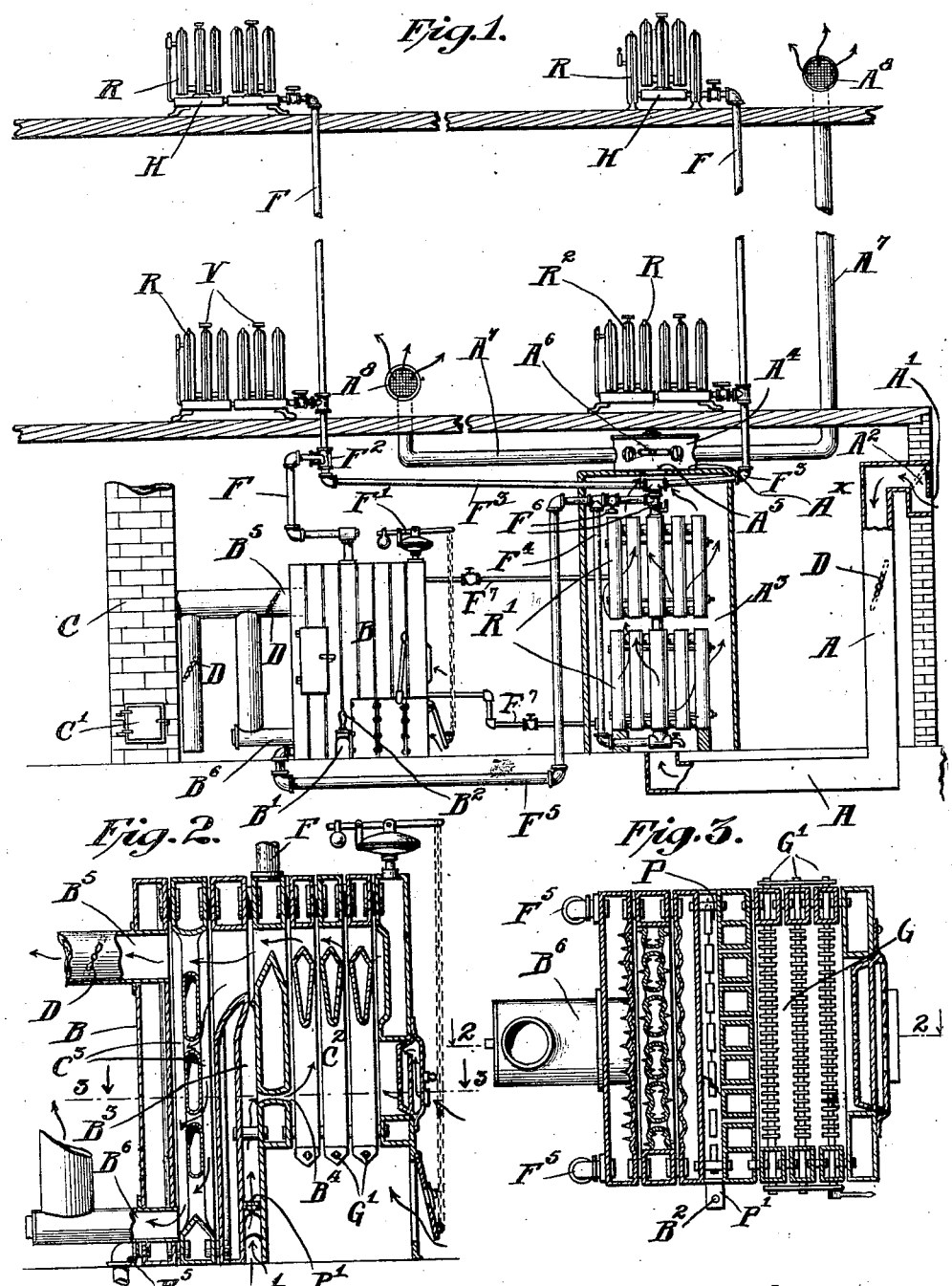
Attest:
Inventor:
Joseph M. W. Kitchen
Geo. L. Wheelock
Atty

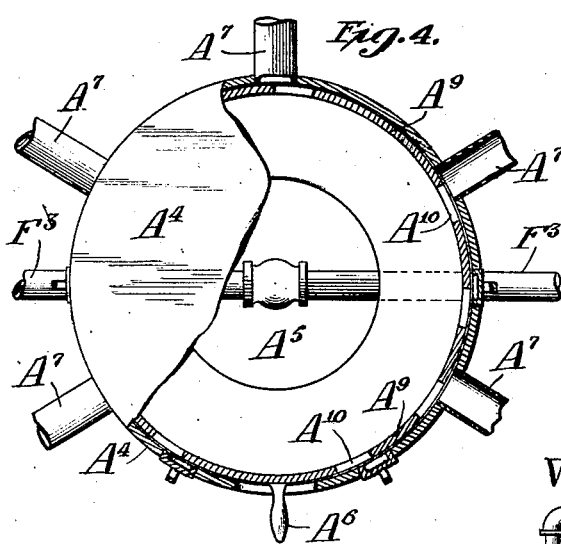
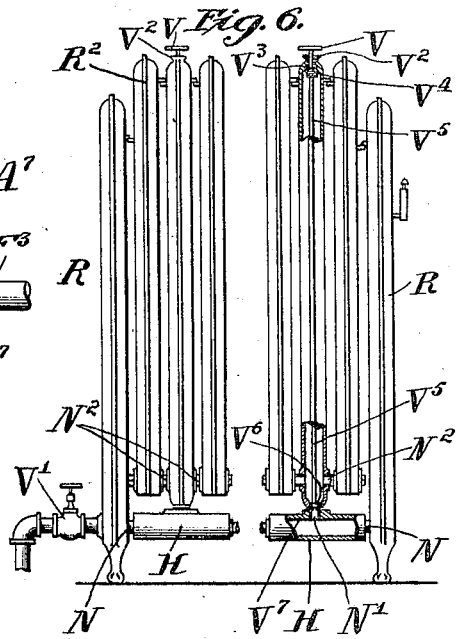
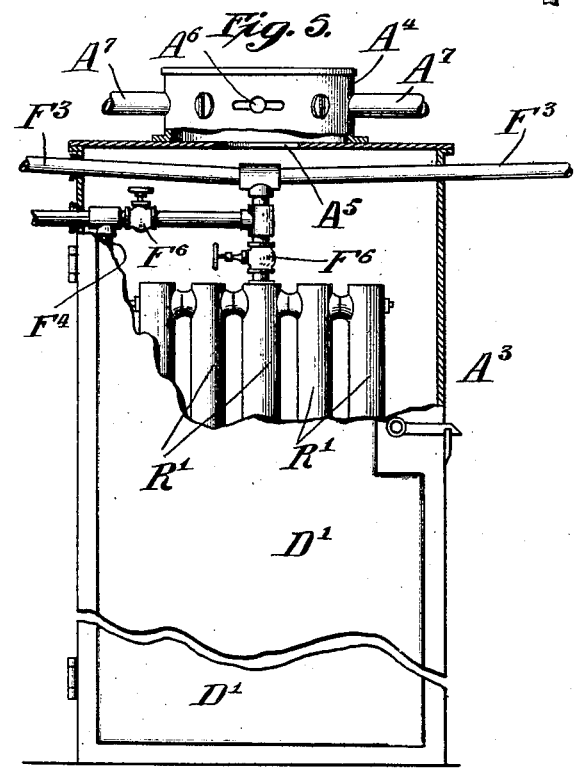
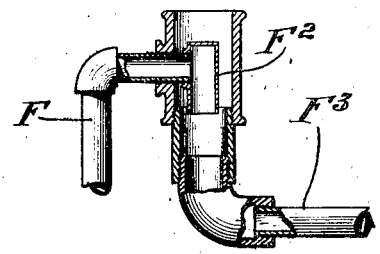

UNITED STATES PATENT OFFICE.

JOSEPH MOSES WARD KITCHEN, OF EAST ORANGE, NEW JERSEY.

HEATING SYSTEM.

No. 880,542.  Specification of Letters Patent.  Patented March 3, 1908.

Application filed January 9, 1907. Serial No. 351,540.

*To all whom it may concern:*

Be it known that I, JOSEPH MOSES WARD KITCHEN, a citizen of the United States, residing at East Orange, in the county of Essex and State of New Jersey, have invented certain new and useful Improvements in Heating Systems, of which the following is a specification.

The object of my invention is to secure comfort and health in dwellings and other buildings, and to decrease the cost of heating through the saving of fuel. It affords the principal advantages of steam, hot water and hot air systems.

My system comprises, (first), a steam boiler designed to secure the transmission of large volumes of the low degrees of heat usually lost in heating apparatus; (second), sectional radiators constructed to vary in a definite manner the amount of radiation from the radiating surfaces; (third), a specially designed and favorably located receptacle for receiving the water of condensation of the system and for cooling the water by conveying the heat of the water to air passed over the radiating surfaces of the receptacle; (fourth), a system of piping so connected and arranged as to intercept any moisture in the steam or water of condensation and to prevent any direct return of the same to the boiler, but to provide for its conveyance to the specially constructed receptacle for containing and cooling the water, and then after the cooling of the water to convey it as feed water to the boiler; (fifth), a means for conveying fresh air to, in contact with, and over the radiating surfaces of the water cooling receptacle; (sixth), means for distributing through various air conduits the air that has been heated through the cooling of the feed water; and (seventh), air conveying conduits and registers for introducing the air into desired places for the purposes of healthful respiration and adjunct heating.

The fundamental idea of the invention is to furnish a feed water of low temperature to the heating appliance in order to absorb low degrees of heat generated in the heating appliance and to economize the heat radiated from the feed water in its cooling.

In the drawings, Figure 1 represents in vertical elevation, with parts in section, the various elements of my invention as ordinarily installed in a moderate sized dwelling, comprising a cellar and two stories. Fig. 2 represents a vertical section of the steam boiler taken on the line 2—2 Fig. 3. Fig. 3 represents a horizontal section of the boiler shown in Figs. 1 and 2, taken on the line 3—3 Fig. 2. Fig. 4 represents on an enlarged scale a view of the upper horizontal surface of an air distributing device shown in Fig. 1. Parts are broken away and parts are shown in section. Fig. 5 represents a vertical view of a combined feed water cooler and air heater, with the air distributing device shown in Fig. 4. This drawing is on an enlarged scale from that of the same device shown in Fig. 1. It is partly broken away and is partly in section and shows part of a door in place that is not shown in Fig. 1. Fig. 6 is a sectional radiator used in my system. Parts are broken away, and parts are in section. This figure is broken in the middle to indicate that additional sections may be inserted as concomitant parts of the radiator. Fig. 7 is an enlarged view of the moisture and the water of condensation intercepter shown in Fig. 1.

The following reference characters indicate as follows:

A is a fresh air duct, $A^1$ is an air inlet, $A^2$ is a swinging wind-brake, $A^3$ is an air heating box or closet, $A^4$ is a heated air distributing device, and $A^5$ is a contracted air orifice in a diaphragm for discharging air into the center of $A^4$.

$A^6$ is the handle to a revolving circular closure slide, having air apertures $A^{10}$, registering with the inlets to air conduits $A^7$, $A^8$ is an air register, $A^9$ is a circular closure slide, and $A^{10}$ are air-slide apertures.

B represents a steam boiler, $B^1$ is an aperture for the entrance of air for combustion, $B^2$ is a handle to a draft slide $P^1$, $B^3$ is an air space dividing the combustion chamber part $C^2$ of the boiler B from the heating cavity $C^3$, $B^4$ is an air aperture for the introduction of over fire air for combustion, $B^5$ is a waste gas exit at a high level, and $B^6$ is a low level gas exit.

C is a chimney, $C^1$ is the chimney flue clean out door, $C^2$ is a combustion chamber, $C^3$ is a heat economizing cavity.

D is a damper, $D^1$ is a door.

F is a steam main, $F^1$ is a pressure draft regulator, $F^2$ is a device for preventing the water of condensation and "priming" moisture from running directly back to the boiler, $F^3$ is a pipe for gravitating hot water to the water cooler and air heater $R^1$, $F^4$ is a vertically disposed pipe for preventing the water in $R^1$ from subsiding to the level of the water in the boiler, $F^5$ conducts cool water to the bottom of the boiler, and $F^6$ are valves for preventing, or for allowing the water of condensation to flow directly to the boiler, or indirectly, through $R^1$ as may be desired.

$F^7$ are pipes for circulating hot water from the boiler through the radiator $R'$ to increase the temperature of the air heated by that radiator.

G is a grate, and $G^1$ represents grate-bar shafts.

H is a horizontally disposed steam conduit or base-member of a section in the sectional radiator R.

N is a screw nipple, $N^1$ is a screw-nipple comprising a valve seat, $N^2$ is a screw-nipple which with others of like size unite the bottom parts of the coils they assemble with, making a secondary horizontally disposed steam conduit lying above the conduit H.

P is a bed plate containing air slots, and $P^1$ is a sliding plate with air slots registering with the slots in P when the handle $B^2$ is pulled out.

R is a sectional radiator, $R^1$ is a receptacle and radiator for holding water of condensation and heating air, and $R^2$ is a section of the radiator R.

V is a valve-wheel for controlling the closure of the valve-parts $V^6$ and $V^7$ in the screw-nipple $N^1$, $V^1$ is a valve for entirely shutting off steam from the radiator R, $V^2$ is a combined packing-compressor and catch-cup for steam or water leakages, $V^3$ is a stuffing box, $V^4$ is a compression screw, $V^5$ is a valve stem extending through the interior of the central coil of the radiator-section from the top of the coil to the valve seat in $N^1$, and $V^7$ is a valve seat.

To secure the most effective working of my heating system it is desirable to have in it a steam boiler through which the heating gases and the feed water travel in reverse currents, and that the feed water be of a relatively cool temperature. These provisions allow for the presence of a temperature in the water in a part of the boiler of a sufficiently low degree to absorb large volumes of low degrees of heat from the heating gases. It is also desirable to have a heat economizing cavity separated from the combustion chamber and furnace of the heater by a heat non-conducting means, such as an air space. The boiler B shown in Figs. 1, 2 and 3 is of this type. It comprises a combustion chamber $C^2$, Fig. 2, having a high run for perfecting combustion and a separate heat economizing cavity, $C^3$, Fig. 2. In this case the chamber and cavity are separated by an air space $B^3$ which prevents a lateral transmission of heat at a low level from the furnace of the heater. The arrows in the drawings indicate the travel taken by the air for combustion and heating gases as they pass through the apparatus. The first application of most of the heat generated, is made at a high level of the apparatus, and is then applied at progressively lower levels as the gases travel downward through the heat economizing cavity $C^3$. By means of the damper in the outlet $B^5$, more or less heat may be allowed to escape by direct up-travel into the flue of the chimney C, and thus more or less regulates the intensity of the draft. Cold feed water is introduced through the feed pipe $F^5$ on each side of the bottom of the rear section of the boiler, and is heated progressively in its travel upward by passing through strata of heating gases of progressively increasing temperatures. The lower degrees of heat in the gases thus find a proper temperature for their absorption into the water traversing the lower levels of the heat economizing cavity of the boiler. This boiler is a modified form of the type of boiler which incorporates principles in the use of which I am already protected by several patents; and nothing specific is herein claimed for it, except in combination. It represents a simple type of steam heater specially appropriate for installation in small and inexpensive heating plants. It has the usual automatic means for closing or opening the ash pit door damper to maintain the special degrees of steam pressure that may be desired in the boiler. There are means for introducing an over fuel-mass air supply through the feed door of the boiler, and through the rear section of the combustion chamber. This latter supply is controlled by the slide $P^1$ operated by the handle $B^2$.

In practice the system works best when a continuous steam pressure is maintained throughout the system.

I now direct attention to the means for varying the amount of radiating surfaces of the system to meet variations in out of door atmospheric temperatures, and to meet the various requirements of household temperatures desired.

It should be noted that in this system I provide means for harmoniously regulating the amount of radiating surface brought into action in proportionate relation to the amount of air introduced for purposes of ventilation and respiration, and for the heating of the air thus introduced, with the water of condensation. The amount of heat conveyed in the water of condensation of course varies with the amount of radiating surface in action; and the volume of air heated by the water of condensation must hence be varied to keep the air thus introduced at a desirable temperature.

R represents a sectional radiator which I preferably use in my system. Each radiator is composed of two or more sections. In ordinary use at least three sections are desirable to secure comfort and economy in heating. Each section is composed of a horizontally disposed base-member or conduit H having laterally placed means N for connection with other sections; such means being exemplified by screw-nipples. Provision is made at the center of the upper surface of the base-member for connection with a vertically disposed central loop or coil $R^2$, the two being joined by a screw-nipple $N^1$ or other coupling containing a valve, which permits the entrance of, or excludes steam from rising into the vertically disposed coil. This valve is manipulated by means of a long valve-stem $V^5$ extending through the interior of the radiator, and up through the top of the coil, near the top of which a compression screw $V^4$ is located, connected with a handwheel above the top of the coil. A steam packing $V^3$ is forced into an intimate contact with the stem $V^5$ by the screw cup $V^2$, the upper cavity of which retains any small amount of water leaking past the valve-stem. The screw-nipple $V^1$ has a valve-seat $V^7$ comprising an accurately fitting seat for the valve plug $V^6$. Screw-nipples $N^2$ allow for the lateral addition of as many coils as may be desired on both sides of the central coil controlled by the special valve mechanism shown. This structure provides for the presence of as many sections in a radiator as may be desired, and for any amount of radiating surface in each of the sections. In every case the width of the assembled coils in one section is the same as the length of the horizontally disposed base-member. In assembling this sectional radiator, the vertically disposed coils are first screwed together; then these several joined coils are attached to the base-member H by means of the nipple $N^1$; and finally, the completed sections are screwed together, forming the entire radiator.

In the heating systems commonly in use, the water of condensation from the radiators is allowed to run directly back into the boiler; and the consequence is that all the water in the boiler soon becomes so heated that there is no water in any part of the boiler of a low temperature to absorb the heat in the gases of a lower temperature than the temperature of the water in the boiler; and hence a large amount of heat is lost in passing out in the chimney gases. To obviate this defect I arrange my piping so that the water of condensation is first returned to and cooled in a specially constructed water containing and air heating radiator $R^1$.

In the drawings, $F^2$ shows a device for preventing the water of condensation from running directly back to the boiler, the steam main F being turned downward in the device and the pipe $F^3$ is so inclined that the water will gravitate into the economizing and cooling radiator $R^1$. For convenience in manufacture and assembling, this cooling radiator may be made in sections screwed one on top of the other, which sections are built up from the floor line to near the ceiling of the cellar to provide for a long vertical travel over the radiating surfaces for the air to be heated. The hot water enters the sections at the top, and leaves at the bottom, being gradually cooled by a counter current of air introduced at the bottom of the box or closet in which the radiator $R^1$ is located, and which is conveyed upwardly over the radiating surfaces. As this device is usually of a greater height than that of the boiler, the feed water pipe $F^4$ is carried up to the highest level of the highest section of this combined water cooling radiator and air heater, and thus prevents the water in it from running down to a level of the water in the boiler. The cool feed water is conveyed through the pipes $F^5$ to the feed water openings provided at the bottom of the rear section of the boiler. Fresh air for respiratory and adjunct heating purposes enters the air inlet $A^1$, which is guarded by the swinging wind-break $A^2$, and passes through the air conduit A and up through the air inclosing box $A^3$, which is provided with a full width door, $D^1$, Fig. 5, for securing access to the heating surfaces of the radiator in the box for the purpose of cleaning them. The air after reaching the top of the box $A^3$ is passed through the contracted aperture $A^5$ into the center of the air distributing device $A^4$. This centering of the air current in the air distributing device helps to secure an equalized distribution of a uniformly heated air through the several air conduits $A^7$. In the interior of this air distributing device is a circular revolving slide $A^9$ (see Fig. 4) which is revolved by the handle $A^6$. This circular slide has air apertures $A^{10}$, registering with the inlets to the air conduits $A^7$; and as the handle $A^6$ is moved one way or the other, all of the inlets to the air conduits are more or less closed or opened at once. When the fresh air passing through this device is too cool or too hot the circular slide is adjusted so as to vary the volumes of the air passing through the device until the air is heated to a desirable degree.

What I claim as new, is,—

1. In a steam heating system, the combination of (1) a steam boiler, said boiler comprising means for absorbing large volumes of low degrees of heat into horizontal strata of water of low temperatures and for absorbing high degrees of heat into horizontal strata of water of high temperatures, (2) means comprising a plurality of radiating units for radiating said absorbed heat and for varying the amount of heat radiated in each radiating unit in consonance with wide variations in the heat radiating requirements of said system to meet atmospheric temperature variations, (3) means for cooling the water of condensation condensed in said system for feed water use in said boiler through the heating of air for respiration, (4) means for conveying steam from said boiler to said means for radiating heat and for preventing the direct return of priming moisture and the water of condensation to said boiler and for conveying said water of condensation and said priming moisture to said cooling means, (5) means for preventing the lowering of the level of the water in the top of said cooling means as the water passes through said means and for conveying said water when cooled to said boiler, and (6) means for distributing the air used in cooling the water of condensation to designated places for the purpose of respiration and adjunct heating and for controlling the amount of air thus distributed.

2. In a steam heating system, the combination of (1) a steam generator comprising means for conveying to cool feed-water high heat and those low degrees of heat in the heating gases that are of a temperature below 150° F., (2) means for radiating the heat generated in said generator, and (3) means for preventing the direct return of the water of condensation from said means for radiating the heat and for conveying said water of condensation to a means for cooling said water, and (4) said means comprising provision for cooling water with cool air and for utilizing said air after its heating by said water of condensation and for returning said water after its cooling to said generator for reheating, said combination providing a feed-water of low temperature capable of absorbing low degrees of heat from the heating gases in said generator and for economizing the heat lost in cooling said water in heating air for respiration.

3. In a steam heating system, the combination of (1) a steam boiler, (2) steam radiators, (3) steam conduits connecting said boiler and said radiators and comprising means for preventing priming moisture and water of condensation from returning directly to said boiler and providing for the conveyance of the water of condensation to a water cooler and air heater, said water being cooled by transmission of its heat to air currents, (4) said water cooler and air heater, and (5) means for conveying said water when cooled from said water cooler and air heater into said boiler at a place where the heating gases traversing said boiler have the lowest temperature.

4. In a heating system, the combination of (1) means for heating gases, (2) means for producing steam from the heat of said gases, (3) means for producing cool feed-water from hot water of condensation, (4) means for heating said cool feed-water progressively with the heat in said gases by transferring the heat progressively from said gases to said water, said gases and said water traversing said boiler in counter currents oppositely to the opposite heating surfaces of the means for effecting the transmission of said heat to said water, (5) a radiating means, and (6) means for automatically maintaining a steam pressure in the steam conveying conduits of said system and for controlling said pressure to any desired degree.

5. In a heating system, the combination of (1) a water containing heat absorbing boiler, (2) heat conveying conduits leading from said boiler, (3) means for radiating the heat transmitted in said boiler, (4) means for intercepting and retarding the flow of water returning from said means for radiating the heat to said boiler and for reducing the temperature of said water when retarded in its return to said boiler by the convection of said heat to air, and (5) means for returning said water entirely devoid of the heat thus reduced by convection to a low level of said boiler.

6. In a heating system, the combination of (1) a steam boiler, (2) radiating units and means for varying the area of the radiating surfaces of the radiating units, and (3) means for cooling the feed-water used in said boiler by cooling the water of condensation and for heating air for respiration and for varying the degree of temperature of said air by increasing or decreasing the volume of air used in cooling said water of condensation in proportionate relation to the amount of water condensed in said system and to the heat conveyed from said water to said air, said last named means comprising provision for controlling the passing of said air through said means for cooling, said provision being located in the line of travel of said air after said air is heated by said water of condensation and for conveying said air to designated places as adjunct means of heating with the steam radiating surfaces of said system.

7. In a steam heating system, the combination of (1) a steam boiler, (2) steam radiators and means for heating variable areas of the radiating surfaces in each radiator, (3) means for cooling water of condensation for feed-water purposes for said boiler, said means for cooling feed-water being arranged for conveying an upwardly traveling current of air over the cooling surfaces of said means and for progressively cooling said water as it gravitates from a high level to a low level through said means for cooling feed-water and for passing said air through a contracted centrally located orifice of said means, said orifice above said means for cooling air, and (4) means above said means for cooling air for controlling the amount of air passing over said cooling surfaces and for equably distributing the air passing over said cooling surfaces to places directly heated by the heat radiated by the steam radiators of said system.

8. In a steam heating system, the combination of (1) a generator for producing steam, said generator comprising, separately, means for substantially perfecting combustion and means for economizing the heat generated by conveying the heating gases produced in said generator through said heat economizing means from a high level to a low level and for conveying cooled feed-water through said economizing means from a low level to a high level to piping for conveying the heat generated in said generator to heat radiating surfaces, (2) said piping and steam radiators and provision for controlling the amount of heat radiated from the radiating surfaces of said radiators, (3) means for returning the water of condensation from said radiators to a means for cooling said feed water, (4) said means for cooling feed-water and means for heating and distributing air for respiration, for cooling the water of condensation therein as feed-water to be used in said generator and for economizing heat by its conveyance to air, (5) means for conveying said water from said means for cooling water to and into the bottom of said economizing means of said generator, and (6) means for preventing the transmission of heat from said means for perfecting combustion to said economizing means except at a high level of said economizing means.

9. In a steam heating system, the combination of (1) a steam boiler, (2) means for radiating through units for radiation the heat conveyed in the steam generated in said boiler, said named means comprising provision for varying the areas of the radiating surfaces in each radiating unit of said means, (3) means for cooling the water of condensation of said system, said means comprising a water cooling radiator and air heater for cooling feed-water by heating air for respiratory and adjunct heating purposes, and (4) means for conveying air heated in cooling said feed-water to places in which it may be respired and used for adjunct heating purposes.

10. In a heating system, the combination of (1) a steam boiler, (2) a steam heat radiating system, (3) a feed-water cooler and air heater, (4) means for intercepting the water of condensation condensed in said radiating system in its return to the boiler and diverting said water of condensation into the said feed water cooler and air heater and for returning said water after its cooling to said boiler, and (5) means for conveying and distributing air for respiration heated in said feed-water cooler and air heater.

11. In a steam heating system, the combination of (1) a steam generator, said generator being constructed to receive and contain cool feed-water and to transmit low degrees of heat into said feed-water, (2) means for conveying the steam generated to a steam radiator, (3) said steam radiator, said radiator being constructed to vary the area of the radiating and condensing surfaces of said radiator, (4) a hot water radiator and means for conveying the heat of water of condensation from said water in said hot water radiator to air for heating and respiration, (5) means for conveying said water of condensation from said steam into said hot water radiator and for preventing the return of said water of condensation to said generator before the cooling of said water of condensation, and (6) means for returning said cooled water of condensation to said generator at a level or place where the water in said generator will be of a temperature to effectively absorb the low degrees of heat in the heating gases passing through said generator.

12. In a heating system, the combination of (1) means for generating heat and transmitting to water the heat generated and for distributing said heat through a system of piping to radiators, (2) radiators for direct heating, (3) means for intercepting water containing part of the heat generated in said system after said water has passed from said radiators, said means being located in the line of the return of said water to the means for generating heat and between said radiators and said means for generating heat, and for receiving and holding said water and for radiating most of the low degrees of heat still contained in said water and for conveying to air for respiration most of the heat of a low temperature still in said water, (4) means for securing the travel of air for its heating over the means for radiating the low degrees of heat of said water, and (5) means for distributing said air and controlling the amount of air heated and for conveying to and passing through an orifice the air heated and for securing an equalized distribution of the air heated to designated places for indirect heating and respiratory purposes, said combination being exemplified in a hot water heating system comprising means located in the line of the travel of the water from the radiators of the system to the boiler, for cooling the water for boiler feeding and for transferring heat to air for direct heating and for respiration.

Signed at New York, N. Y., this 4th day of January, 1907.

JOSEPH MOSES WARD KITCHEN.

Witnesses:
  GEO. L. WHEELOCK,
  RAYMOND LE BLANC.